United States Patent [19]

Sikes

[11] Patent Number: 5,018,213

[45] Date of Patent: May 21, 1991

[54] METHOD AND APPARATUS FOR REGISTRATION MARK IDENTIFICATION

[75] Inventor: Dale R. Sikes, Burlington, Mass.

[73] Assignee: Web Printing Controls Co., Inc., Barrington, Ill.

[21] Appl. No.: 193,314

[22] Filed: May 11, 1988

[51] Int. Cl.[5] .................... G06K 9/00

[52] U.S. Cl. .................... 382/8; 250/559; 250/571; 356/429; 364/469

[58] Field of Search .................... 382/8, 34, 1, 17; 356/429, 421, 445, 448; 250/559, 561, 571; 364/469, 471; 400/611

[56] References Cited

U.S. PATENT DOCUMENTS

| | | | |
|---|---|---|---|
| 4,318,176 | 3/1982 | Stratton et al. | 364/469 |
| 4,366,542 | 12/1982 | Anselrode | 364/469 |
| 4,528,630 | 7/1985 | Sargent | 364/469 |
| 4,561,103 | 12/1985 | Hariguchi et al. | 382/36 |
| 4,794,453 | 12/1988 | Gnuechtel et al. | 358/101 |
| 4,836,446 | 6/1989 | Reynolds et al. | 382/8 |

*Primary Examiner*—David K. Moore

*Assistant Examiner*—Joseph Mancuso

*Attorney, Agent, or Firm*—Welsh & Katz, Ltd.

[57] ABSTRACT

Apparatus and method particularly suitable for use with the close loop color to color registration system of a commercial web printing apparatus utilizes a CCD camera for identifying registration marks. The registration mark composed of a pattern of dot pairs is acquired by the camera and each dot pair of the mark is identified by scoring various attributes of possible dot pairs including color, size and position. This results in highly stable and reliable acquisition of a registration mark on a printed web which may then be processed by an automated registration control system.

14 Claims, 6 Drawing Sheets

METHOD AND APPARATUS FOR REGISTRATION MARK IDENTIFICATION

BACKGROUND OF THE INVENTION

This invention relates generally to the field of inspection by a video camera in real-time of registration marks, and more particularly to a method and apparatus for identifying the correct marks among many possible marks within the field of view of an inspecting camera particularly suitable for a closed loop color to color registration system in commercial web printing apparatus.

Video inspection of registration marks is well recognized in the prior art as an important element in the implementation of automated web registration in commercial web printing environments. Of particular interest are multi-color printing machines in which successive printing operations are performed in a plurality of colors on a moving web at successive repeat lengths. In such systems it is necessary that the locations on the web at which the successive printing operations are performed have a predetermined relationship to one another. Each printing operation applies a different color in a predetermined pattern to the web superimposed to form a desired multi-color image. To obtain high quality resolution in the final product it is necessary that the patterns printed be precisely aligned. This alignment is referred to as registration.

It is known in the prior art that registration of the printed pattern may be checked by printing registration or alignment marks on the printed web. This may be done, for example, by applying a mark of one color having a tolerance range and then printing a mark of another color within the tolerance range of the first mark. The operator then evaluates the registration marks and by controlling axial, circumferential, and skew adjustments controls registration. This adjustment process is very time-consuming and demanding on press operators and introduces the possibility of error as well as limiting the accuracy with which register may be controlled. Thus, automatic measurement and control of registration adjustment is highly desirable.

One approach to automatic registration control compares the location of the registration mark on the web at each printing stage and adjusts the work applying members of the printing apparatus until the locations of the marks have a predetermined relationship. Such a system employs a photoelectric sensor for detecting the position of the registration marks applied to the web.

In one prior art system utilizing a CCD video camera, a video image of the signature of the web or a portion is acquired and processed by an automatic control system to identify registration marks and their locations. Since the signature has a consistent repeat length, the approximate recurring location of the registration marks is predictable. To acquire a video image from the moving web, a high intensity, short duration illuminating source (e.g., a strobe light) may be utilized to stop the motion. However, in the prior art, the registration marks can sometimes be misidentified because more than one mark with the same detected color and correct position may be found within the field of view of the camera. This is especially a problem when special colors are used. This prevents reliable registration mark acquisition and analysis, thereby preventing reliable color to color registration.

It is accordingly an object of this invention to provide a novel method and apparatus for selecting the proper registration marks found with the field of view of the inspection camera of an automated registration system to permit reliable high speed real-time registration mark acquisition.

It is yet another object of the invention to provide a novel and reliable method and apparatus for an automated registration system in which reqistration mark scoring is utilized to increase reliability of color to color registration.

It is another object of the invention to provide a novel method and apparatus for scanning registration marks found within the field of view of the inspection camera to eliminate marks that would confuse the automated registration system.

Briefly, according to one embodiment of the invention, apparatus is provided for identifying each color component of a color-to-color registration mark comprising a pattern of a plurality of multiple element color components in a multi-color automatic registration system. For example, in the illustrated embodiment, the mark comprises a pattern of a plurality of dot pairs each having two dots with one pair associated with each color of the system. Apparatus is provided for locating each element of the registration mark, for determining position, color and size information for each element and for matching mark elements to identify each possible multiple element component based upon the position and color information. Apparatus is also provided for scoring the possible components by accumulating a score for each possible component based upon the position, color and size information and for selecting the color components to be utilized as identified color components of the registration mark based upon the scores.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figures 1A, 1B:
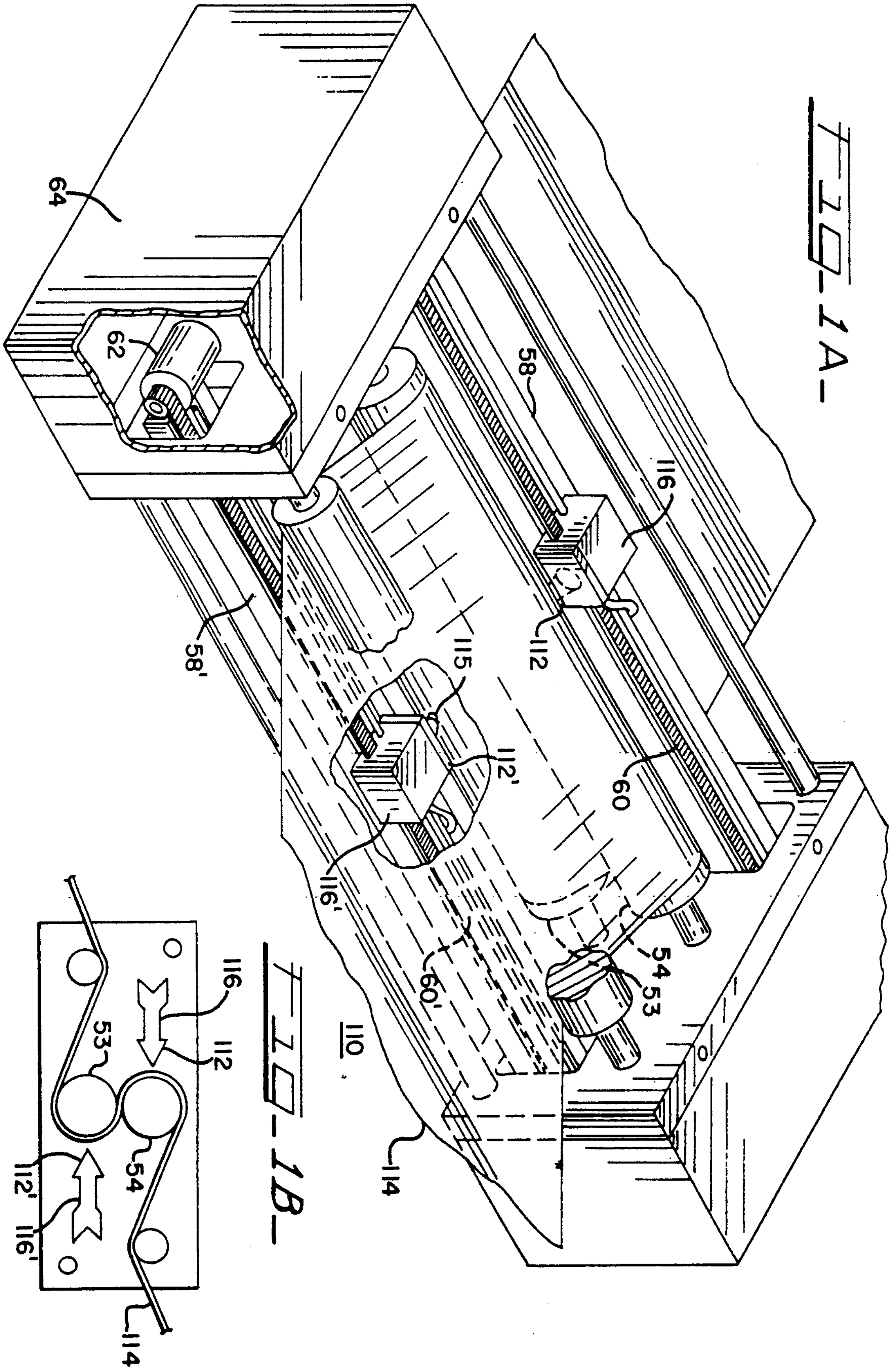
FIG. 1A is a pictorial view illustrating a specific embodiment of web processing apparatus according to the invention.
FIG. 1B is a diagrammatic side view illustrating the specific embodiment of the web processing apparatus shown in FIG. 1A.

FIG. 1A is a pictorial view illustrating a specific embodiment of a registration system 110 for inspection of a predictable asynchronous registration mark on a surface 114 by video cameras 116, 116' according to the invention. In the apparatus 110, high intensity, short duration illuminators 112, 112' (e.g., a conventional strobe light, a pulsed laser, etc.) is utilized to illuminate the surface 114 in order to stop the motion of a registration mark printed thereon to permit inspection and identification of the mark 10 (See FIG. 2A) by the image acquisition camera 16 and the system 110. Such a system is described in detail in a co-pending application entitled "Method and Apparatus for Stroboscopic Video Inspection of an Asynchronous Event" filed Sept. 9, 1986, by H. Gnuechtel and S. Kosmen bearing Ser. No. 905,707 which issued as U.S. Pat. No. 4,794,453, which is hereby incorporated by reference.

In the illustrated embodiment, the surface is a moving web within a multi-color web printing press and the mark of interest is a registration mark, indicia, or some desired portion of the printed pattern (i.e., a portion of the web signature) printed on the web. Since the web printing apparatus utilizes a known repeat length, it can be predicted that the registration mark will return periodically to approximately the same location with an accuracy such that it will fall within the area viewed by the camera periodically with the period determined by the repeat length cycle time of the web printing apparatus.

Figure 3:
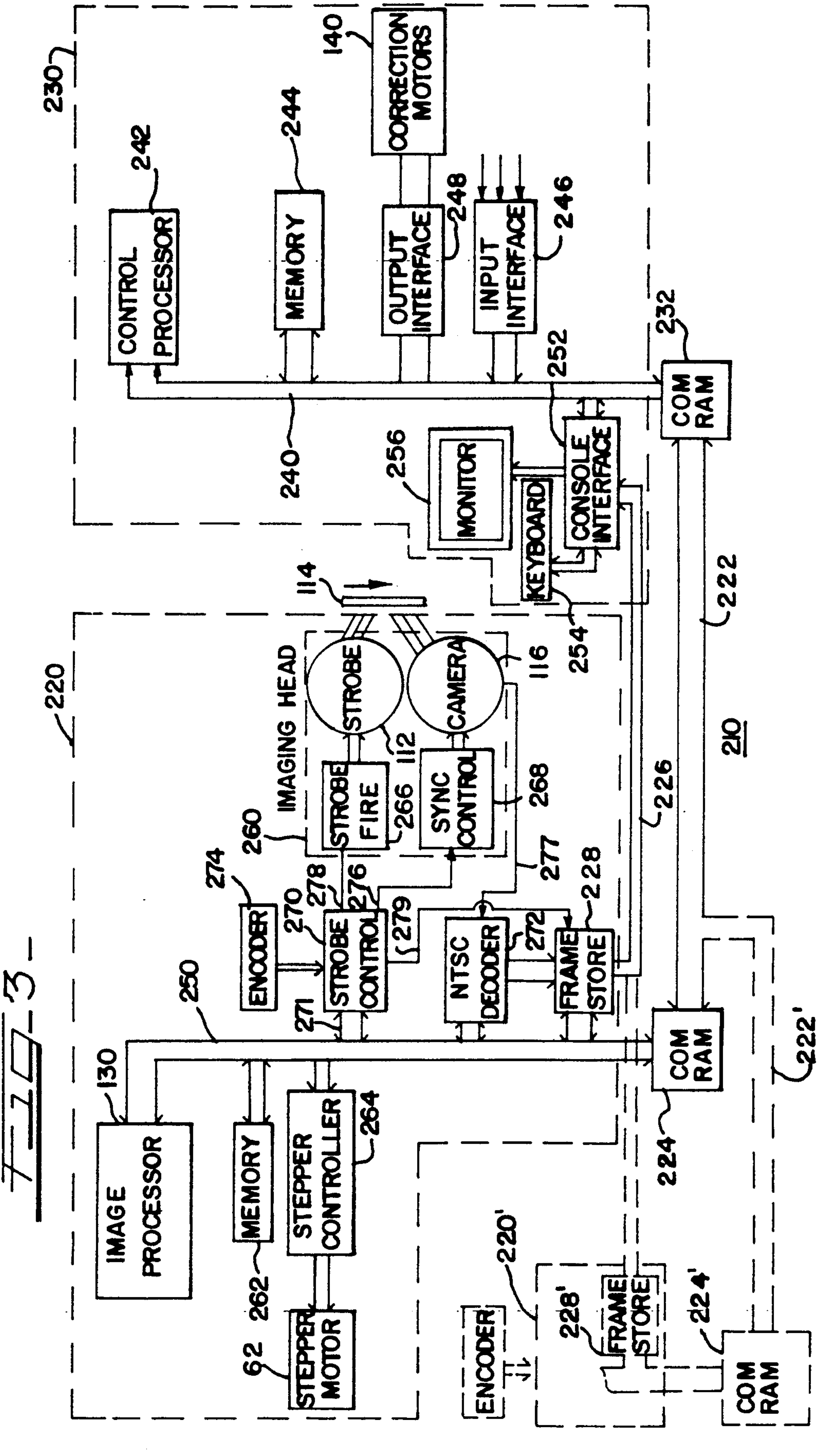
FIG. 3 is a block diagram illustrating a specific embodiment of automatic color to color register control apparatus for a multi-color web printing apparatus in accordance with the invention.

The moving web 114 may be monitored, for example, by a position encoder (not shown) to provide a feedback signal which is coupled to system logic circuitry 210 (see FIG. 3). This feedback signal can be utilized in the prediction of the location of the registration mark. Thus, in web printing apparatus, a position encoder is typically provided which indicates the start of each repeat length. This signal, together with the position of the registration mark relative to the beginning of the repeat length cycle is utilized to predict a time when the mark will be within the camera image field. The strobe control 270, under control of the system logic 210, then can fire the illuminator 112 (e.g., a conventional strobe light in the illustrated embodiment) so as to stop the motion of the web at the predicted time when the registration mark is within view of the camera 116.

The image data obtained during the image acquisition by the camera initiated at the time of the firing of the strobe is coupled from the camera 116 to the system logic 210 for storage in a memory and for processing. The image is processed then to determine the relative position of the different color registration marks and to generate control signals to control registration.

The illustrated embodiment of the invention shown in FIGS. 1A and 3 comprises an automatic color to color registration system for a multi-color web printing apparatus. FIG. 1A shows a pictorial view illustrating a portion of a web printing apparatus 110 with portions removed. A moving web 114 (shown to be substantially transparent to reveal associated rollers and the like) is positioned over rollers 53, 54 to facilitate movement of the web through the apparatus 110. Two image acquisition cameras 116, 116' are provided to permit inspection of both sides of the printed web 114 together with associated strobe lights 112, 112' to provide stroboscopic illumination. The cameras 116, 116' are mounted, as shown, on supporting tracks 58, 58' which include positioning belts 60, 60' capable of moving the cameras 116, 116' to any desired position along the tracks 58, 58'. The belts 60, 60' are driven by conventional stepper motors 62 (only one shown), which are controlled by an image processor 130 (see FIG. 3) contained within the control circuitry enclosure 64, thereby enabling the processor 130 to control positioning of the cameras 116, 116'. FIG. 1B illustrates in a diagrammatic form the path of the web 114 and location of the cameras 116, 116' and strobe 112, 112'.

In operation, the cameras 116, 116' and the strobes 112, 112', under control of the control circuitry shown in FIG. 3, stroboscopically acquire an image of a region 115 (approximately 0.2 inch 0.2 inch in the illustrated embodiment) on the surface of the web which is the field of view (i.e., image field) of the camera 116 and within which the registration mark (not shown) is located at the time the strobe is fired. The image data generated by the camera in acquiring the image is coupled to the control circuitry within the enclosure 64 which analyzes the image data to extract registration information. This information is used to control registration correction motors 140 (see FIG. 3) to maintain color to color registration.

Figure 2A:
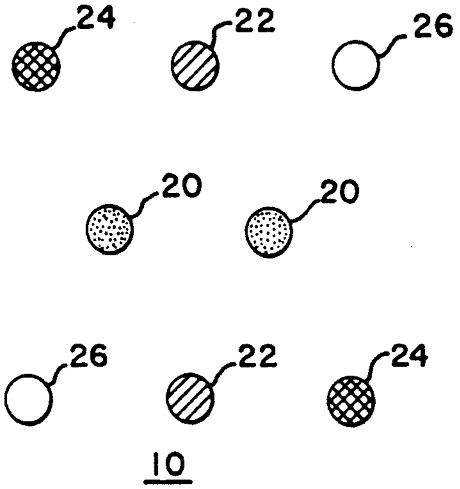
FIG. 2A is an illustration of a specific embodiment of a dot pattern used for color to color registration of process colors.

Referring now to FIG. 2A, there is shown an illustration of a specific embodiment of a registration mark or target 10 with four process colors (typically and in the illustrated embodiment, the four process colors are black, yellow, magenta, and cyan) comprising a set of four dot pairs 20, 22, 24 and 26, configured as shown. The dot pair registration mark 10 is a specific example of a registration mark having multiple element (dots) color components (a pair of dots for each color). Although, in the illustrated embodiment, the registration mark consists of a pattern of pairs of dots, numerous suitable registration marks would be apparent to those skilled in the art. In a typical color printing apparatus, four standard process colors are printed by four separate units in series. Thus, each dot pair in FIG. 2A is printed by a different print unit, each of which prints a dot pair of a unique process color. Thus, for example, dot pair 20 may be black, dot pair 22 may be cyan, dot pair 24 may be yellow, and dot pair 26 may be magenta. In the illustrated embodiment, the dots are twelve thousands of an inch in diameter, are located 24 thousands inch apart horizontally, and form a substantially square pattern.

Figure 2B:
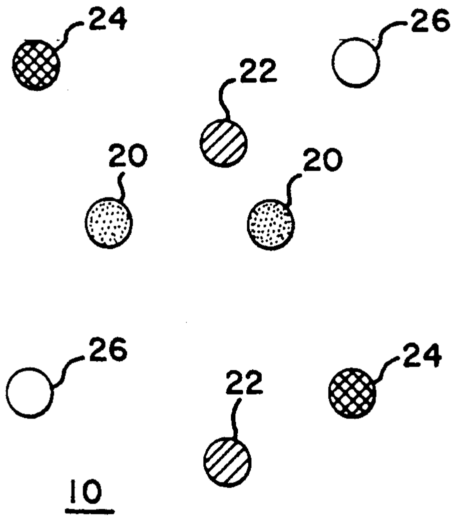
FIG. 2B is an out-of-registration example of the registration dot pattern of FIG. 2A.

During the printing operation, each dot pair is printed along with the color component of the printed image for the respective print unit. If the resulting printed image is in perfect color to color registration, the registration pattern will appear as in FIG. 2A. However, if one or more print units is out of registration, the respective dot pairs will be shifted relative to each other, as is shown by the example of FIG. 2B. In FIG. 2B, the cyan dot pair 22 is shown shifted down and to the right of its proper in registration position relative to the other dot pairs, indicating that the cyan print unit is out of register. This information is detected by the system 110 and utilized to control registration.

Figure 2C:
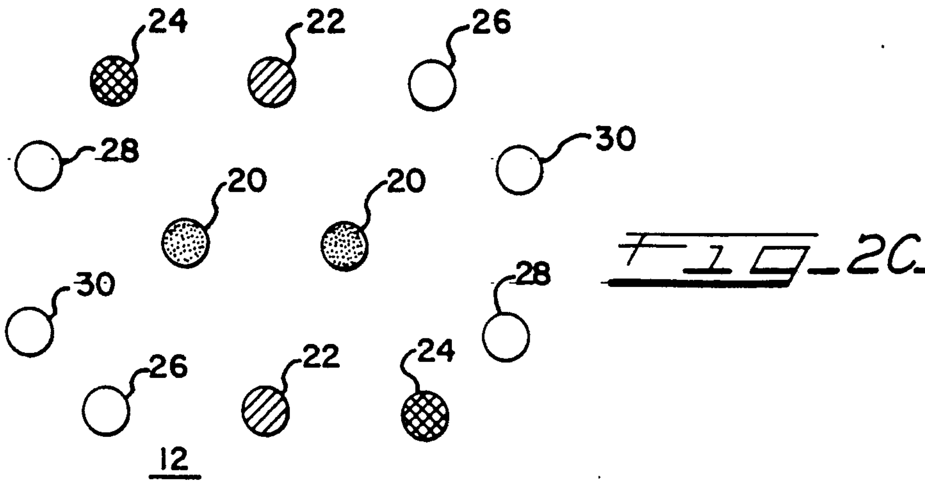
FIG. 2C is an illustration of a specific embodiment of a dot pattern used for color to color registration of process colors and two special colors.

In some instances, special colors may also be utilized for particular print jobs where a special color may be required. In such cases, additional dot pairs may be used to permit automatic registration of the special colors. FIG. 2C is an illustration of a specific embodiment of a registration dot pattern 12, which includes two special color dot pairs 28, 30.

The automatic register control system 110 acquires a video image of the registration marks, such as those shown in FIGS. 2A-2C, printed on the moving web. Registration is maintained by acquisition and processing of an image of the printed registration mark by the imaging circuits 220, 220' (See FIG. 3) to determine a shift in the position of a dot pairs relative to each other. This information is then utilized by the control circuit 230 to generate control signals to adjust the web printing via correction motors 140.

Initially the operator may enter the coordinates of the registration mark to enable the system to begin a scan of the appropriate area of the coordinates to locate the dot pattern. Once the pattern is located, the individual dots are located and a table of the position, color, number of pixels of each color in the dot, the height, and the width for each dot is made. The information in the table is then used to match dots to form pairs based upon color and relative position information. For example, all black dots are compared with each other to determine which pair has the correct position relationship to permit it to be a proper black pair within a predetermined tolerance (e.g., ±10% of the ideal position relationship). Thus, the black dot could be required to be separated horizontally by 35 pixels and vertically by zero pixels. Once all the dot pairs are identified, their position relationship to each other is used to control registration adjustment.

In some instances, more than one pair of dots will meet the position and color requirement for a dot pair, thereby preventing reliable identification of the pattern and preventing reliable registration adjustment. This problem is particularly acute when special colors are used because the special colors often appear to meet the criteria for one of the process colors. As a result, when more than one pair of the dots meets the basic color and position requirements for a pair, additional position, size and color information is utilized in a dot pair scoring technique to identify the correct pair.

In the dot pair scoring technique, a score is accumulated for each dot pair. A zero score is optimal. For each dot pair of each color, the difference in the number of pixels between the dots of each pair is accumulated for special colors, and for processed colors a value of ten is added to the score if the dots are different colors. Then the difference in number of pixels of width and height is added to the score for each pair, along with the difference in the number of pixels from the ideal horizontal and vertical relative positions between the dots of the pair. This total score is then used to select the pair for each color which has the lowest score. If any one dot is then used in more than one pair, a value of ten is added to the score for both pairs of which it is used. The final dot pairs are then selected for each color based upon the lowest scoring pair.

One special condition that occurs is a dot "crash" in which two dots are printed on top of each other. This is particularly a problem when a black dot is printed on another color dot. This possibility is taken into consideration during the initial color and position based dot pair matching if only one dot of a given color pair can be found (i.e., no other dot of the same color matches the proper position). In this event, the black dots will be compared to the unmatched dot and if a position match is found, a pair is formed. However, a value of ten is added to the score for that pair.

The block diagram of FIG. 3 illustrates a specific embodiment of system circuitry 210 for the color to color registration system of the multi-color web printing apparatus 110 of FIG. 1A according to the invention. The registration control circuitry 210, and optional additional imaging circuits 220', permit use of multiple cameras (e.g., one for each side of the web as shown in FIG. 2) with one control circuit 230. The imaging circuit 220 is coupled to a standard bus 222 through a dual port random access memory (e.g., comprising Hitachi HM6116's) which serves as a communications memory 224, as shown. Each additional imaging circuit 220' is coupled to the bus 222 through its own communications memory and bus as illustrated by the communications memory 224' and the bus 222'. Each imaging circuit 220, 220' also comprises a frame store circuit 228, 228' which is coupled to a frame store bus 226, as shown. The associated circuitry for each imaging circuit is identical to that of the image circuit 220. Therefore, the additional circuitry is not shown in detail and the description of the imaging circuit 220 is applicable to any additional imaging circuits 220'.

The imaging circuit 220 is coupled to the control circuit 230 via the bus 222 through a communications memory 232 which serves as a memory buffer for transfer of data to and from the imaging circuit communications memory 224. Thus, the communications memory circuits 224, 232 serve as interface buffers between the control circuit bus 240 and the imaging circuit bus 250.

The control circuit bus 240 may be a standard bus (e.g., in the illustrated embodiment a STD BUS as marketed by Pro-Log Corp.) for coupling a control processor 242 (e.g., in the illustrated embodiment a 7804A-O processor card as marketed by Pro-Log Corp.) to peripheral circuits. A memory 244 coupled to the bus 240 provides memory (both random access memory such as M5M5128 by OKI and read-only memory such as AMD2764 by Advanced Micro Devices) to provide program and data storage while an input interface 246 provides for input of additional data input to the processor 242 via the bus 240, as shown. A conventional optically coupled output driver 248 (e.g., a 065A optically coupled triac marketed by Opto-22) couples control signals generated by the processor 242 from the bus 240 to the correction motors 140 to control the correction motors and thereby control registration.

Also coupled to the bus 240 is a conventional console interface 252 which provides an interface between the bus 240 and a console keyboard 254, as well as a console monitor 256, as shown. This interface permits operator input (e.g., such as input of registration mark coordinates) to the system circuitry 210 via the keyboard 254 and permits the operator to monitor the system operation. In addition, the console interface 252 couples video image data stored in the frame store memory 228 to the monitor 256 via the bus 226, as shown, thereby permitting the operator to view the acquired images of registration marks on the monitor 256.

The frame store memory 228 is also coupled to the bus 250 of the imaging circuit 220, as shown. The bus 250 is a standard bus (e.g., in the illustrated embodiment a STD BUS as marketed by Pro-Log Corp.) for coupling the image processor 130 (in the illustrated embodiment a 7804A-O processor card marketed by Pro-Log Corp.) to peripheral circuits. A memory 262 is coupled to the bus 250 to provide program and data memory for the image processor 130, and control signals generated by the processor 130 are coupled from the bus 250 to a stepper motor controller and driver 264, as shown. The stepper motor controller 264 drives the stepper motor 62 which positions the camera 116 and strobe 112 over the web as previously described with reference to FIG. 1A.

The video camera 116 and the strobe light 112 together with a strobe charge and fire circuit 266 and configured as shown, form an imaging head 260. The imaging head 260 communicates with the processor 130 and the frame store 228 via a strobe control circuit 270 and a conventional NTSC to cyan, magenta and yellow decoder 272. The strobe control circuit 270 and the NTSC decoder 272 are coupled to the processor through the bus 250 as shown. Also coupled to the strobe control circuit 270 is a position encoder 274.

In operation, the camera synchronization circuit 268 generates periodic scan (i.e., refresh) pulses (e.g., one every 20 milliseconds in the illustrated embodiment) which maintain the required charge and strip dynamic conditions necessary for proper operation of the camera's image sensor. A predetermined time (20 milliseconds in the illustrated embodiment) before the registration mark is expected to be directly within the image field of the camera 116, the strobe controller 270 under control of the image processor 130 generates a trigger pulse. This trigger pulse is coupled to the camera synchronization control circuit 268 via a conductor 276, as shown. The trigger pulse disables the scan pulse generation and immediately triggers a new image acquisition scan pulse. This scan pulse causes the camera to go through a normal image acquisition scan cycle (i.e., vertical field scan of the image sensor) which sets up the sensor (for acquisition of the desired image) during the predetermined time period prior to firing the strobe 112. If the registration mark recurs with a period sufficiently short (e.g., approaching two times the predetermined time period or less) then the refresh pulses will be continuously disabled and only prefresh pulses will be generated prior to actual image data acquisition.

At the end of the predetermined time period (i.e., 20 ms in the illustrated embodiment), a second trigger pulse is generated by the strobe controller 270 which is coupled to the strobe charge and fire circuit 266 via a conductor 278, as shown. This pulse triggers the firing of the strobe 112 to illuminate the surface of the moving web 114 when the registration mark thereon is within the field of the camera 116. A predetermined time (approximately 0.5 milliseconds in the illustrated embodiment) after the firing of the strobe another scan pulse is generated which triggers the camera to do an image acquisition scan of the image sensor. The video image data (in standard NTSC format) output from the camera 116 as a result of this image acquisition scan is coupled to the NTSC decoder 272 via a conductor 277 in FIG. 3, as shown.

The video image data, which represents the web surface where the registration mark is located, is decoded into pixels of cyan, magenta and yellow by the NTSC decoder. The decoded data is stored in the frame store memory 228 which in the illustrated embodiment may be composed of one 256 by 256 bit digital memory for each color. The frame store memory 228 is triggered to store the image data by a third pulse from the strobe controller 270 coupled to the frame store 228 via a conductor 279, as shown.

Figure 4:
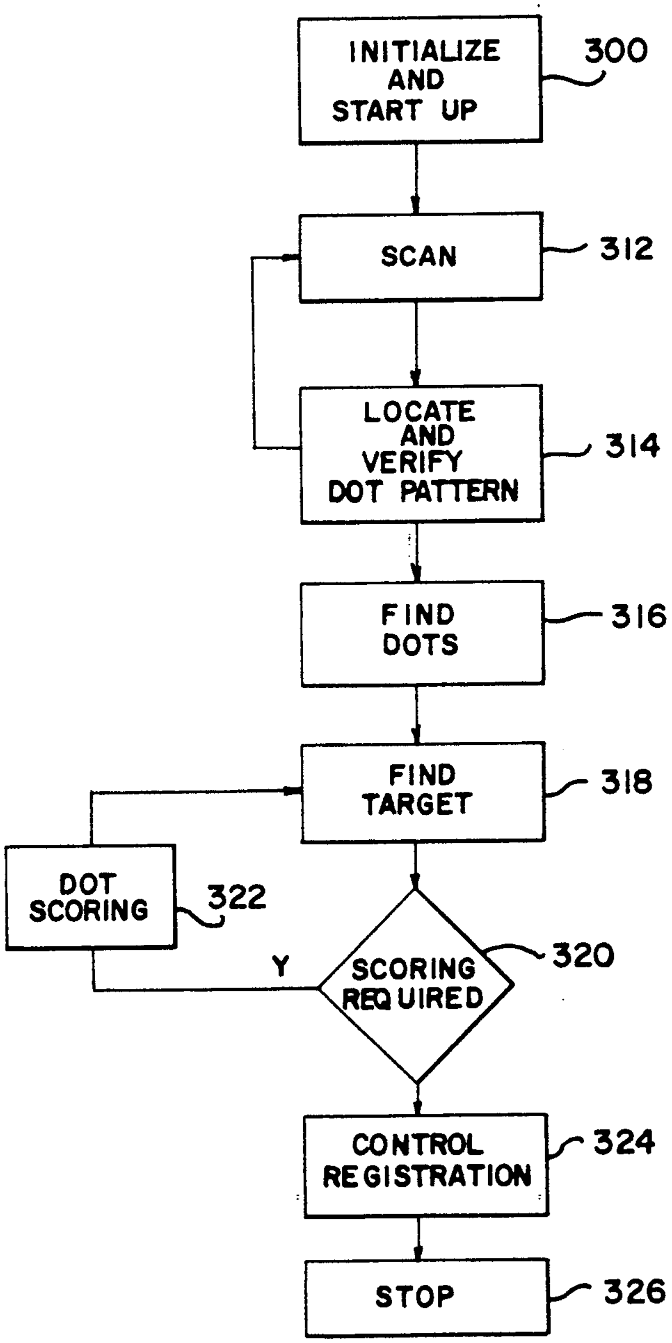
FIG. 4 is a generalized flow diagram illustrating the methodology and structural flow for an automatic registration function according to the invention.

Referring now to FIG. 4, there is shown a generalized flow diagram illustrating the methodology and structural flow for an automatic registration function for a specific embodiment of the system of FIG. 1A and 3. The program begins with standard initializing of flags, etc., and such startup inputs from the operator as the x,y coordinates of the target registration pattern, as illustrated by block 300. Subsequently, a vertical scan is made to search for the target dot pattern by moving the camera to the correct horizontal position and firing the strobe repeatedly to locate the correct y position for the dot pattern by detecting the approximate print density (i.e., pixel count) associated with the target. Once the target is found, processing flow will proceed to a "locate and verify" routine, as illustrated at block 314. To locate and verify the dot pattern, the pixel count is checked to determine if it is sufficient to constitute a proper target or is too high a count for a proper target, and then the dots are located and counted. Once the dots are counted, the number is tested to determine if there are enough dots to constitute a pattern or if there are too many dots. Typical values which may be used in the illustrated embodiment are a minimum of four and a maximum of 15 dots. In addition, the height and width of the dot pattern is checked to insure that it is approximately correct. If the target found fails any of these tests, process control returns to the scan, as shown at block 312.

If the result of the pattern verification is affirmative, then process control proceeds to the FIND DOTS routine as indicated at block 316. The FIND DOTS routine, as described in greater detail hereinafter, creates a table of color, size and position information for each dot. Process control then transfers to the FIND TARGET routine as indicated at block 318. The FIND TARGET routine primarily determines dot pairs based upon basic color and position information. If the routine is unable to determine unique dot pairs for all of the dots, then as indicated at block 320, process control branches to a dot scoring routine 322. The dot scoring routine 322 in conjunction with the FIND TARGET routine 318 uses a scoring technique to distinguish the correct dot pairs based upon more detailed information of size, position and color. Once a final determination of dot pairs is made, process control transfers to the control registration routine 324, as indicated by block 320. The control registration routine utilizes the relative position information of the identified dot pairs to control print registration in a conventional manner. Registration control continues until the system is stopped as indicated at block 326, for example, by operator intervention.

Figure 5:
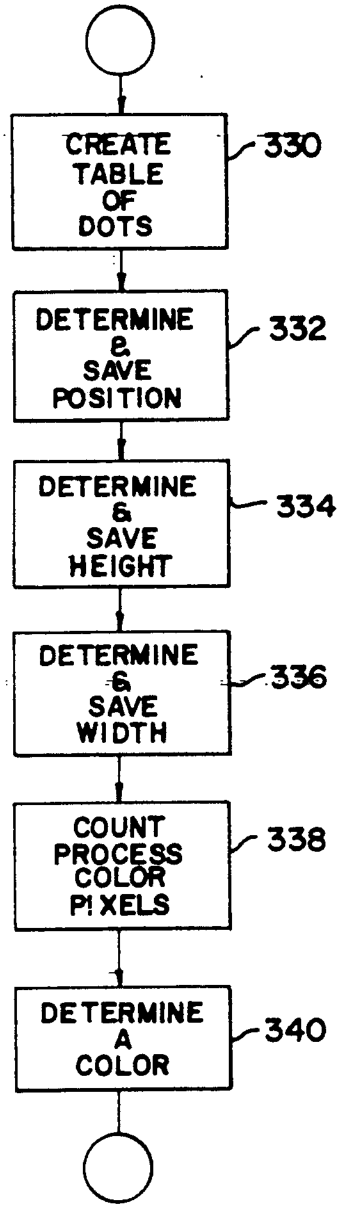
FIG. 5 is a detailed flow diagram illustrating the methodology and structural flow for a FIND DOTS routine as shown in FIG. 4 for a specific embodiment of the illustrated automatic registration system of FIG. 1A according to the invention.

Referring now to FIG. 5, there is shown a detailed flow diagram illustrating the methodology and structural flow for a FIND DOTS routine for a specific embodiment of the routine shown in FIG. 4. The FIND DOTS routine begins with the creation of a table of all of the dots as illustrated at block 330, after which the position of each dot is determined and saved in the table as illustrated by block 332. Program flow then proceeds to block 334 where a determination of the height of each dot (in pixels) is made and the value is saved in the dot table, after which a determination of the each dot width is made and the value is also saved in the dot table as illustrated by block 336. Process flow then continues to block 338 where a pixel count of each process color in each dot is made. This count is made by creating a rectangle around the dot using a height and width of the dot previously determined. This rectangle is then scanned and the color value of each pixel in the rectangle is counted for each process color (i.e., black, cyan, magenta, yellow). The result for each color is saved for each dot in the dot table. Subsequently, a color determination is made for each dot, as indicated at block 340, wherein a flag is set for one or more of the four process colors based on a determination of whether the pixel count for that color is greater than a certain minimum (e.g., 100 pixels). Crashed dots and special color dots will often appear as more than one color, and therefore more than one of the color flags will be set. After the color determination is put into to the table of dots, program flow transfers to the FIND TARGET routine as indicated by FIG. 4.

Figure 6:
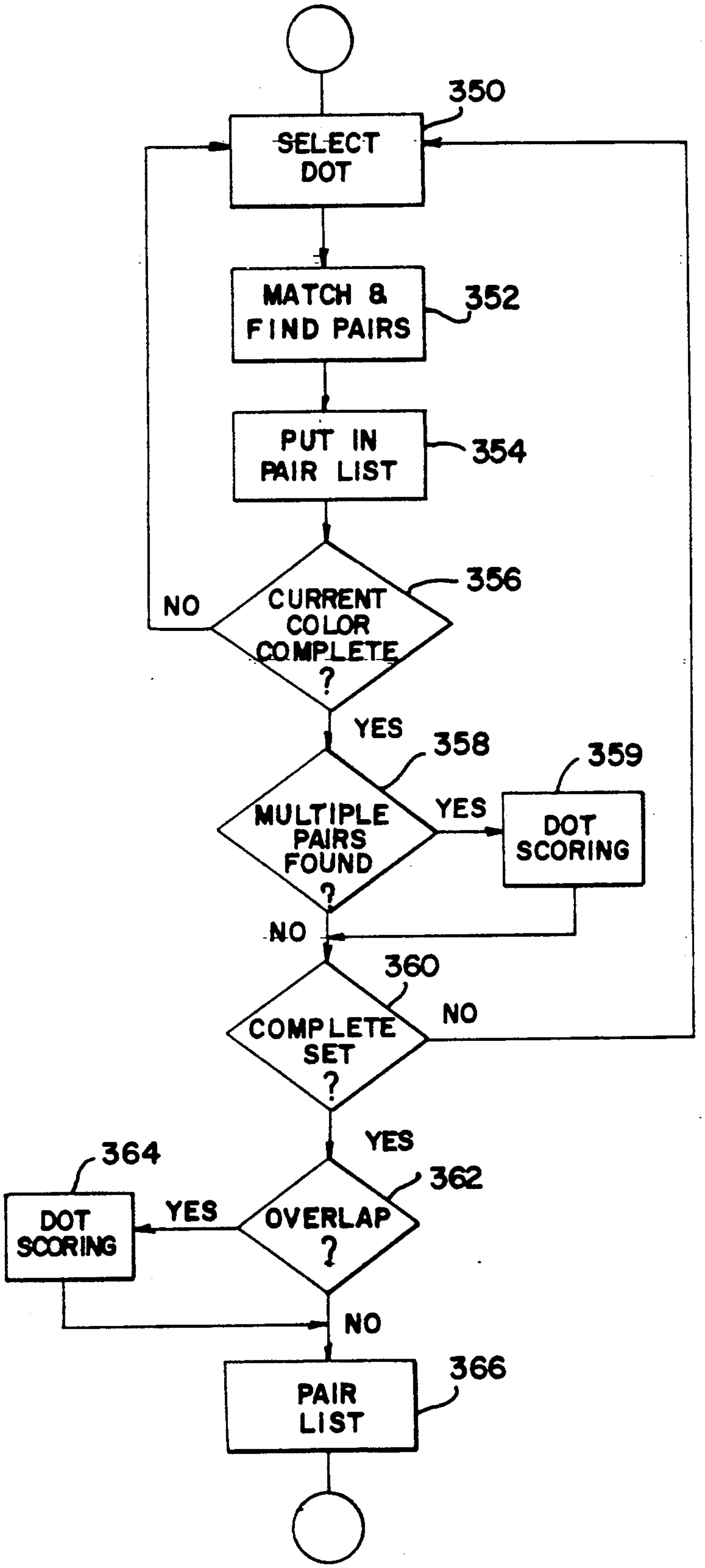
FIG. 6 is a detailed flow diagram illustrating the methodology and structural flow for a FIND TARGET routine as shown in FIG. 4 for a specific embodiment of the illustrated automatic registration system of FIG. 1A according to the invention.

Referring now to FIG. 6, there is shown a detailed flow diagram illustrating the methodology and structural flow for a FIND TARGET routine for a specific embodiment of the system as illustrated in FIG. 4. The FIND TARGET routine begins as illustrated at block 350 with the selection of a first dot corresponding to the color of the first print unit. This dot will often be associated with a control pair which is used as a reference in the registration process and is often a black dot. After finding a first dot of the desired color (i.e., unit), the system looks for another dot of the same color as identified in the FIND DOTS routine and attempts to make a match based upon position criteria only. For example, a black dot might be selected and then the routine would look through the dot list to find another black dot and then determine whether the horizontal difference is approximately the desired value, such as 35 pixels, and if the vertical difference is approximately the desired zero pixels. If the criteria is met, the dot pair found is put into a dot pair list, as indicated at block 354. A test is then performed as indicated by block 356 to determine whether all possible matches have been made for that particular dot color and if the result is negative, process flow branches back to block 350 to select a next dot in the list for that color and proceed to attempt to match and find another pair.

This process will continue until all possible matches for the initial color have been made, at which point the process flow will then proceed to the test block 358 where a test is performed to determine if more than one pair has been found for that particular color of dot. If the result of that test is affirmative, process flow branches to the DOT SCORING routine 359 to score the pairs found and determine the one with the lowest score after which process flow branches back to block 360, as indicted. If the result of the test at block 358 is negative, process flow proceeds to block 360 where a test is performed to determine if all dot colors and types have been matched, and if the result is negative, process flow branches back to block 350 where another color dot is selected and the matching process is repeated. If the result at block 360 is affirmative, process flow continues to block 362 indicating that pair matching has been completed for all dot colors (i.e., all units).

In the case of special color dots, no color criteria is used for this type of dot because it is not one of the four process colors. Therefore, each dot on the list is taken and compared by position criteria only with each of the other dots to determine if a proper position match can be found for that special color dot pair. All pairs found are then put into the pair list, and if more than one is found, the dot scoring routine is called as in the case of process color dots. After all dot colors have been pair matched tested, an overlap test on all pairs is performed, indicated at block 362, is performed to determine if any dots are included in more than one pair. If the result is affirmative, the dot scoring routine is called and a score of ten is added to each pair in which a dot is shared after which process control returns from the dot scoring routine, as shown. If the result at block 362 is negative, process flow continues to block 366 where the final pair list is completed and control transfers to the control registration routine as indicated by FIG. 4.

Figure 7:
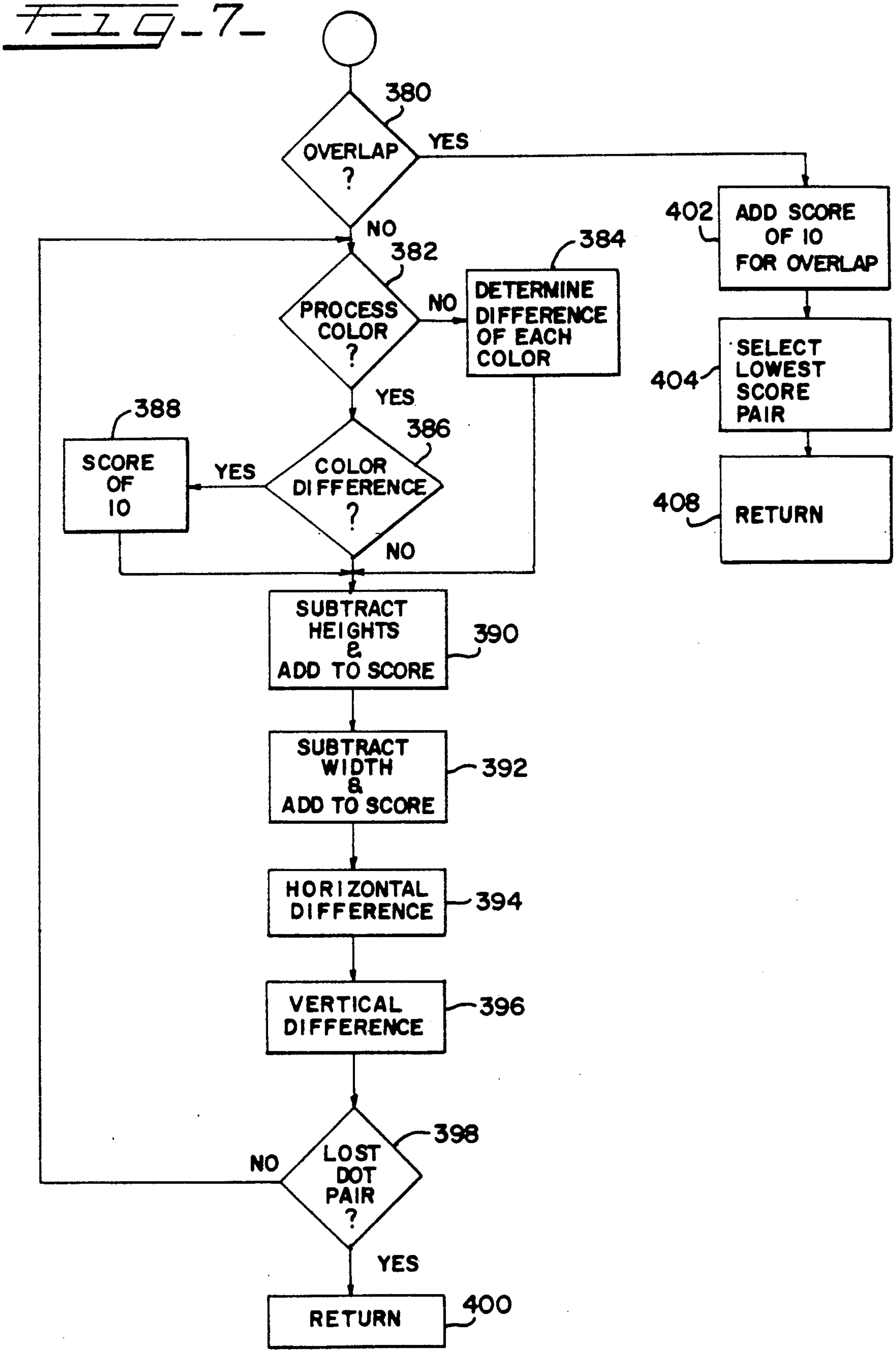
FIG. 7 is a detailed flow diagram illustrating the methodology and structural flow for a DOT SCORING routine as shown in FIG. 4 for a specific embodiment of the illustrated automatic registration system of FIG. 1A according to the invention.

FIG. 7 is a detail flow diagram illustrating the methodology and structural flow for a DOT SCORING routine for a specific embodiment of the system as illustrated in FIG. 4. The DOT SCORING routine begins with a test to determine whether the entry to the routine is a first pass entry or a second pass due to the detection of a dot pair overlap in which one dot is used in multiple pairs. If the result of the test at 380 is negative, the process control proceeds to a test at block 382 to determine whether the dot pair being processed is a process color or a special color. If the dot pair is a special color pair, process flow branches to block 384 where a determination is made of the difference in the number of pixels of each process color in the dots of the pair. Those values are accumulated as a score for the pair after which process flow branches to block 390, as shown. If the result at block 382 is affirmative indicating that the dot is a process color dot, then process control branches to block 386 where a test is performed to determine if the color of the two dots of the pair are different. If the result is affirmative, a score of ten is assigned as indicated at block 388 and otherwise process flow branches back to block 390, as shown.

If the result at block 386 is negative, process flow continues to block 390. As indicated at block 390, the height values of the two dots in the pair are subtracted and the value is added to the score of the pair. Subsequently, as indicated at block 392, the widths are then subtracted and the difference added to the score of the pair. Then, as indicted at block 394, the difference between the horizontal difference between the two dots of the pair and the perfect horizontal difference is determined and the value is added to the score for that pair. Subsequently, the vertical difference from perfect for the pair is determined and the value is added to the score for the pair, as indicated at block 396. Program control then proceeds to a test at block 398 to determine if the last dot pair has been processed and if not, program control branches back to block 382, as shown. If the last dot pair of the color unit being tested has been processed, then process control returns to the point at which the dot scoring routine was entered as indicated in FIG. 4.

If the result of the test at block 380 was affirmative, indicating that there were dot pair overlaps, then process flow branches to block 402 where a value of ten is added to the score for each pair with an overlap. Subsequently, at block 404, the pair for each color with the lowest score is selected for that color. Process control then returns to the point at which the routine was entered, as indicated at block 408.

Specific embodiments of the method and apparatus for identification of registration marks in real-time has been described for purposes of illustrating the manner in which the invention may be made and used. It should be understood that implementation of other variations and modifications of the invention in its various aspects will be apparent to those skilled in the art and that the invention is not limited by the specific embodiments described. It is therefore contemplated to cover by the present invention any modifications, variations or equivalents that fall within the true spirit and scope of the basic underlying principles disclosed and claimed herein.

What is claimed is:

1. Apparatus for identifying each multiple element color component of a color-to-color registration mark comprising a pattern of a plurality of multiple element color components in a multi-color automatic registration system, comprising:

means for locating each element of the registration mark and for determining position, color and size information for each element;

means for matching mark elements to identify each possible multiple element component based upon the position and color information to obtain possible multiple element components;

means for scoring the possible multiple element components by accumulating a score for each possible multiple element component based upon the position, color and size information; and, means for selecting the multiple element color components to be utilized as identified multiple element color components of the registration mark based upon the scores.

2. The apparatus of claim 1 wherein the registration mark comprises a pattern wherein each element is a dot and each multiple element component is comprised of a dot pair of two dots each with each dot pair associated with a different color.

3. The apparatus of claim 1 wherein the means for locating and determining comprises means for determining the position coordinates of each element, means for determining the height and width of each element, and means for determining the number of pixels of each process color of the multi-color system for each element.

4. The apparatus of claim 3 wherein the means for scoring further comprises means for determining a difference between the heights of each element of a possible multiple element component and for assigning a score to the possible multiple element component responsive to the difference.

5. The apparatus of claim 4 wherein the means for scoring further comprises means for determining a difference between the widths of each element of a possible multiple element component and for assigning a score to the possible multiple element component responsive to the difference.

6. The apparatus of claim 5 wherein the means for scoring further comprises means for determining a horizontal and vertical difference between each element of a possible multiple element component and for subtracting each difference from a reference difference for the elements of a desired multiple element component and for assigning a score to the possible multiple element component responsive to the result of the subtraction.

7. The apparatus of claim 6 wherein the means for scoring further comprises means for identifying potential multiple element components from the possible multiple element components, one for each color of the multi-color system, responsive to the scores, and means for detecting a condition in which the same element is part of more than one potential multiple element component, and for adding a predetermined score value to the score of each potential multiple element component in which such a condition is detected.

8. The apparatus of claim 1 wherein the means for matching identifies each possible multiple element component of a desired multiple element color component by identifying multiple element components in which the relative position of each element substantially corresponding to reference positions for elements of a desired multiple element component.

9. The apparatus of claim 1 wherein the means for locating and determining comprises means for counting pixels of each process color of the multi-color system and means for accumulating a count of pixels of each color for each element.

10. The apparatus of claim 9 wherein the means for scoring comprises means for determining a difference in the count of pixels of each color between elements of a possible multiple element component and for assigning a score to the possible multiple element component responsive to the difference.

11. The apparatus of claim 1 wherein the means for locating and for determining comprises an image capture device for capturing an image of the registration mark in color.

12. A method of identifying a color to color registration mark printed on a moving web comprising a plurality of multiple element components in a multi-color automatic registration system, the method comprising the steps of:

acquiring an image of the registration mark and processing the mark to verify the presence of the mark;

locating each element of the registration mark;

determining position, color and size information for each element;

identifying each possible multiple element component responsive to the position and color information to obtain possible multiple element components;

accumulating a score for each possible multiple element component responsive to the position, color and size information; and, selecting the multiple element components to be utilized as the multiple element components of an identified registration mark responsive to the scores.

13. The method of claim 12 wherein the step of accumulating further comprises the step of adding a predetermine value to the score of each possible multiple element component having an element also included in any other possible multiple element component.

14. Apparatus for an automatic color-to-color registration system in a multi-color printing apparatus wherein a registration mark comprising a pattern of a plurality of multiple element components is printed on a moving web, comprising:

a camera system for acquisition of an image of the registration mark printed on the moving web;

processing means for processing the acquired image of the registration mark comprising means for locating each element of the registration mark and for determining position, color and size information for each element, means for matching mark elements to identify each possible multiple element component based upon the position and color information to obtain possible multiple element components, means for scoring the possible multiple element components by accumulating a score for each possible multiple element component based upon the position, color and size information, and means for selecting the color multiple element components to be utilized as identified multiple element components of the registration mark in response to the scores;

means for controlling color-to-color registration on the moving web of the multi-color printing apparatus responsive to the relative positions of the multiple element components of the registration mark.

* * * * *